United States Patent [19]
Vetter

[11] Patent Number: 5,680,695
[45] Date of Patent: *Oct. 28, 1997

[54] HAIRPINLACING APPARATUS

[76] Inventor: Klaus-Dieter Vetter, 1755 Maple Ave., Croydon, Pa. 19021

[*] Notice: The term of this patent shall not extend beyond the expiration date of Pat. No. 5,533,251.

[21] Appl. No.: 491,258

[22] Filed: Jun. 16, 1995

[51] Int. Cl.$^6$ ................................................ B23P 15/00
[52] U.S. Cl. .................. 29/727; 29/726.5; 29/890.043; 29/890.047
[58] Field of Search .................. 29/726.5, 726, 29/727, 463, 465, 890.043, 890.047

[56] References Cited

U.S. PATENT DOCUMENTS

| | | |
|---|---|---|
| 4,519,121 | 5/1985 | Yokosawa . |
| 4,601,088 | 7/1986 | Kopczynski . |
| 4,734,969 | 4/1988 | Currier et al. . |
| 4,747,208 | 5/1988 | Sbalchiero et al. ............... 29/726 |
| 4,771,526 | 9/1988 | Arzenti et al. ............... 29/726 |
| 4,839,950 | 6/1989 | Stroup . |
| 5,003,691 | 4/1991 | Milliman et al. ............... 29/726 |
| 5,154,679 | 10/1992 | Fuller et al. . |
| 5,220,722 | 6/1993 | Milliman ............... 29/727 |
| 5,426,847 | 6/1995 | Honma et al. ............... 29/726.5 |
| 5,533,251 | 7/1996 | Vetter ............... 29/727 |

FOREIGN PATENT DOCUMENTS

| | | | |
|---|---|---|---|
| 1349844 | 11/1987 | U.S.S.R. ............... | 29/726.5 |

Primary Examiner—Irene Cuda
Attorney, Agent, or Firm—Gregory J. Gore

[57] ABSTRACT

An apparatus provides automatic lacing of hairpin tubes through the holes of a heat exchanger fin stack. This apparatus includes a plurality of identical extendable guide rods, each positioned in approximate alignment to engage an open end of a respective heat exchanger tube which is positioned adjacent to a respective fin stack hole. The plurality of guide rods are extended in unison through the holes of the heat exchanger fin stack to positions within the open ends of the hairpin tubes. Lead guides are located toward the end of each guide rod. The lead guides have forward and backward tapered surfaces extending from a central portion of maximum diameter. The lead guides ensure that the holes in the individual fins are moved into coaxial alignment with the guide rods as they travel through the fin stack. Once the guide rod ends are within the open ends of the hairpin tubes, self-aligning engagement fingers on each guide rod lead end expand to engage the internal diameter of a respective hairpin tube. The guide rods are then retracted in unison pulling the tubes through the fin stack holes. A self-regulating pressure mechanism assures that the pressure exerted by expanding fingers is within a predetermined range. Once the tubes have been laced, the engagement fingers are collapsed and the guide rods withdrawn from the tubes.

4 Claims, 6 Drawing Sheets

HAIRPINLACING APPARATUS

FIELD OF THE INVENTION

The present invention relates to the "hairpin" lacing process portion of the manufacture of heat exchangers and an apparatus used for automatic hairpinlacing. In particular, it relates to the apparatus and process of automatically drawing/inserting copper or aluminum or other suitable material cooling tubes through a stack of thin, pliable aluminum fins which have been punched for receiving said cooling tubes.

BACKGROUND OF THE INVENTION

Heat exchangers have many uses in industry and commerce. Large numbers of them are used in the automotive industry for radiators, oil coolers, and air conditioning heat exchangers.

The generally accepted construction for such heat exchangers includes a plurality of spaced, parallel, longitudinally extending first fluid carrying tubes. A plurality of spaced, heat transfer "fins" are mounted on these fluid carrying tubes and are surrounded by a second fluid medium.

In automotive heat exchangers, the first fluid carrying tubes are generally of copper or aluminum or other suitable material and the head transfer fins are soft, pliable, and thin aluminum sheet material.

The manufacturing process for such heat exchangers has been automated to some extent. However, one portion of this manufacturing process which has remained manual, and therefore labor intensive and slow, has been the lacing of the heat exchanger tubes through holes punched through the fins.

Efforts have been partially made to automate the assembly process for these heat exchangers. In this regard, a plurality of fins are cut and assembled into a "stack". This stack is then machine punched for the intended pattern of the tubes.

As the tubes are to serpentine back and forth through the fin stack, assembly has been further partially automated by first joining pairs &parallel extending tubular legs with elbows (return tubes) to form a "hairpin". These hairpins are then gently inserted through an adjacent pair of holes in the fin stack by an assembly operator.

After all of the tubes have been inserted through the fin stack, from a first side of the stack, the hairpin tubes are expanded to fit tightly within the fin stack and the opposite side return bends are connected to the tubes.

Prior patent art known to the applicant which pertains to his invention includes: U.S. Pat. No. 4,519,121 issued to Yokosawa on May 28, 1985; U.S. Pat. No. 5,154,679 issued to Fuller et al on Oct. 13, 1992; U.S. Pat. No. 4,601,088 issued to Kopczynski on Jul. 11, 1986; U.S. Pat. No. 4,734,969 issued to Currier et al on Apr. 5, 1988; and U.S. Pat. No. 4,839,950 issued to Stroup on Jun. 20, 1989. None of these prior art references teach or suggest the applicant's novel and unobvious hairpinlacing system described herein.

Previous attempts to automate hairpinlacing have proved unsuccessful as there has been no apparatus developed which can lace the tubes through the punched holes in the stack of fragile fins without either elongating the punched holes, or bending or otherwise distorting the fins.

It is necessary to draw the tubes through the fins in a noise and vibration-filled environment without distorting the fins or the punched holes therethrough, beyond the tolerances specified for the expanding apparatus, which later expands the tubes to fit tightly against the fins.

It is desirable to provide an uncomplicated, reliable, accurate apparatus for automatically drawing the heat exchanger hairpins through the prepunched holes of a fin stack.

SUMMARY OF THE INVENTION

An object of the present invention is to provide an apparatus and a process for the automatic lacing (drawing) of hairpin tubes through the punched holes of a heat exchanger fin stack without disturbing (elongating) those punched holes, without bending the fragile fins, and without binding the tubes.

A second object is to provide such an apparatus which includes a hairpin tube engagement structure that is uncomplicated and reliable and which compensates for minor misalignments.

A further object is to provide such an apparatus with a self-regulated engagement pressure.

The objects of the present invention are realized in an automatic hairpinlacing process and an apparatus for performing this process. In the manufacturing of heat exchangers, heat-radiating fin sheets are stacked, hole punched and then clamped. A plurality of tubing hairpins, having open-ended parallel legs at one end and an elbow at the other end, are assembled in a matrix and then aligned with the fin stack holes with their open ends juxtaposed to these punched holes.

A matrix of the hairpin tube engaging guide rods is then extended through the fin stack holes. Each guide rod carries a self-aligning, expandable end structure. The expansion pressure of each expandable end structure is individually regulated.

Once the matrix engaging guide rods are positioned within the matrix of hairpin tube open ends, the expandable end structures are expanded to engage the inside walls of the hairpin tubes. After the hairpin tubes are engaged, the matrix of guide rods is retracted to pull (lace) the hairpin tubes through the fin stack.

The automatic hairpinlacing structure has first and second individually operated drives. A mounting block which carries the matrix tube engaging guide rods is moved in a predetermined manner by the first drive.

Each tube engaging guide rod is a tubular structure which has a cylindrical axial bore and an expandable end with a self-aligning tapered profile. This expandable end includes a plurality of radially positioned and longitudinally extending expander fingers.

Positioned concentrically within each guide rod is an expander rod having a tapered expander tip operating in the region of the expander fingers. Each expander finger on a guide rod includes a spring portion, an expander rod mating portion, and a tube engagement tapered portion.

An expander rod movement compensator spring is connected between each expander rod and the second drive. This compensator spring operates as a pressure regulator or self-adjusting pressure mechanism, with respect to the force exerted by the expander tip on the radially movable expander fingers. The expander fingers comprise an expanding structure for engaging and pulling against the I.D. of a tube.

Once the matrix of tubes is engaged by the matrix of expanded fingers, the first drive which carries the second drive retracts the structure to lace (pull) the tubes through the fin stack.

The first and second drives are operated first individually, then together, then individually to effect the extension, engagement, retraction/lacing, and release steps.

More specifically, the applicant has invented a hairpin tube lacing apparatus, comprising: a plurality of heat exchanger fins clamped laterally to create a fin stack, each of the fins being yieldably movable vertically and having a plurality of registered lateral holes forming a plurality of cylindrical cavities in the stack for receiving hairpin tubes; a plurality of guide rods, each having a double tapered lead guide at a first end, and being held by a mounting block at a second end, each guide rod being axially aligned and centered about a corresponding fin hole cavity; means for moving the mounting block laterally, forward and backward between extended and retracted positions respectively, the extended position placing each of the first ends of the guide rods completely through a corresponding fin hole cavity to a point on an opposite side of the fin stack; a first tapered surface on the forward side of the lead guide convergent in the forward direction providing a forward lead guide surface of the guide rod for the fins; a second tapered surface on the backward side of the lead guide convergent in the backward direction providing a backward lead guide surface for the hairpin tube; a plurality of hairpin tubes having open parallel tubular legs at one end and an elbow at the other end, each leg held on the opposite side of the fin stack in axial alignment with one of the guide rods; means for forcibly engaging the tapered first ends of the guide rods with open ends of the hairpin tubes while the guide rods are in the extended position; and means for moving the rods and tubes in unison in the backward direction through said fin stack to the retracted position.

In an alternate embodiment, the hairpin tube engaging structures within the guide rod are replaced by motive means for applying force and movement to the hairpin tube in the backward direction. In this case, engagement between the end of the guide rod and the hairpin tube is provided by an applied force at the elbow end of the hairpin tube which in turn forces the open end of the tube against the end of the guide rod. Alignment is maintained by the tapered end of the guide rod which wedges against the hairpin tube opening. This force may also be sufficient to move the hairpin tube and guide rod back through the fin stack and the force may be applied to effect that movement. Alternatively, the guide rods and tubes may be individually moved by separate means coordinated to hold the guide rods and tubes in abutment while moving them in unison.

The features, advantages, and operation of the present invention will be better understood from a reading of the following detailed description of the invention, in conjunction with the following drawings.

DETAILED DESCRIPTION OF THE INVENTION

Figure 1:
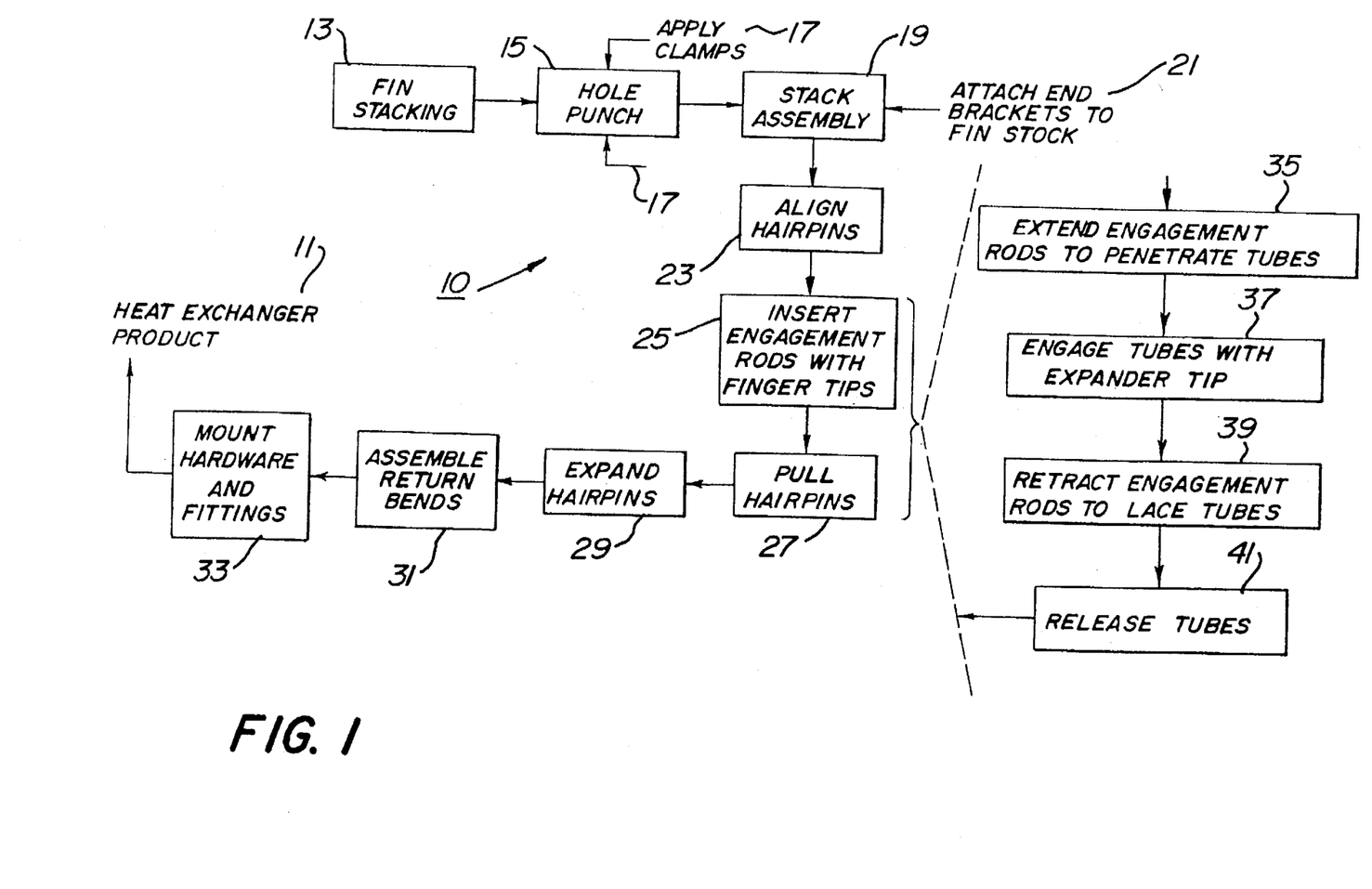
FIG. 1 is a block diagram of the manufacturing process for a heat exchanger product showing the steps of the automatic hairpinlacing process of the present invention.

An automatic hairpinlacing process is carried out as part of the manufacturing process 10, FIG. 1, for a heat exchanger product 11. This heat exchanger product 11 is made by first stacking a plurality of heat transfer fins, step 13, and then punching a plurality of holes 15 through this stack to receive a plurality of fluid (liquid or gas) carrying tubes, commonly called hairpin tubes.

The hole punched, fin stack is held together by clamps 17 and then further assembled 19, including the attachment of end brackets to the fin stack 21.

A matrix of hairpin tubes is aligned 23 with the fin stack hole matrix, which necessarily forms a plurality of laterally-extending, cylindrical fin hole cavities. This fin stack hole matrix has been aligned with the automated hairpinlacing apparatus.

Thereafter extendable engagement rods, which engage the hairpin ends, are inserted 25 through the fin stack hole cavities. This structure engages the hairpin tube open ends and pulls 27 the hairpin through the fin stack.

Thereafter the hairpins are expanded 29 to fit tightly against the fin stack holes and the return bends are assembled 31 on the hairpin ends.

The remaining hardware and fittings are assembled 33 onto the heat exchanger to produce the heat exchanger product 11.

The insertion step 25 and pulling (lacing) step 27 are implemented by the following steps. First, the engagement rods are extended 35. Then the ends of these rods expand to engage the hairpin tubes 37. Thereafter, the engagement rods are retracted 39 to pull the hairpin tubes through the fin stack holes. Finally, the engagement rods are released 41 from the tubes.

Figure 2:
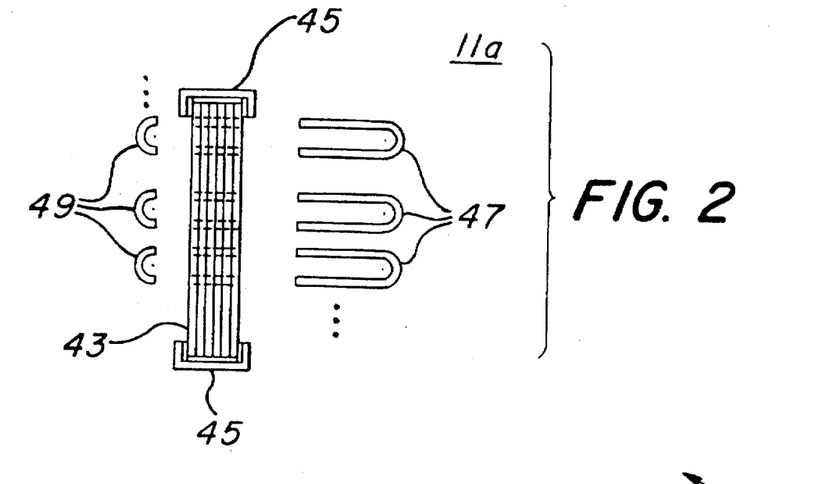
FIG. 2 is an expanded side view of a partially assembled heat exchanger showing the fin stack, hairpins, and return bends.

A partially assembled heat exchanger product 11a is shown in partially expanded view in FIG. 2. During lacing the fin stack 43 remains stationary, held together by clamps and end brackets 45 and is prepunched to receive a plurality of hairpin tubing subassemblies 47 which are mated to return elbows 49. Each tube includes open-ended parallel legs 46 at one end and an elbow at the opposite end.

Figure 3:
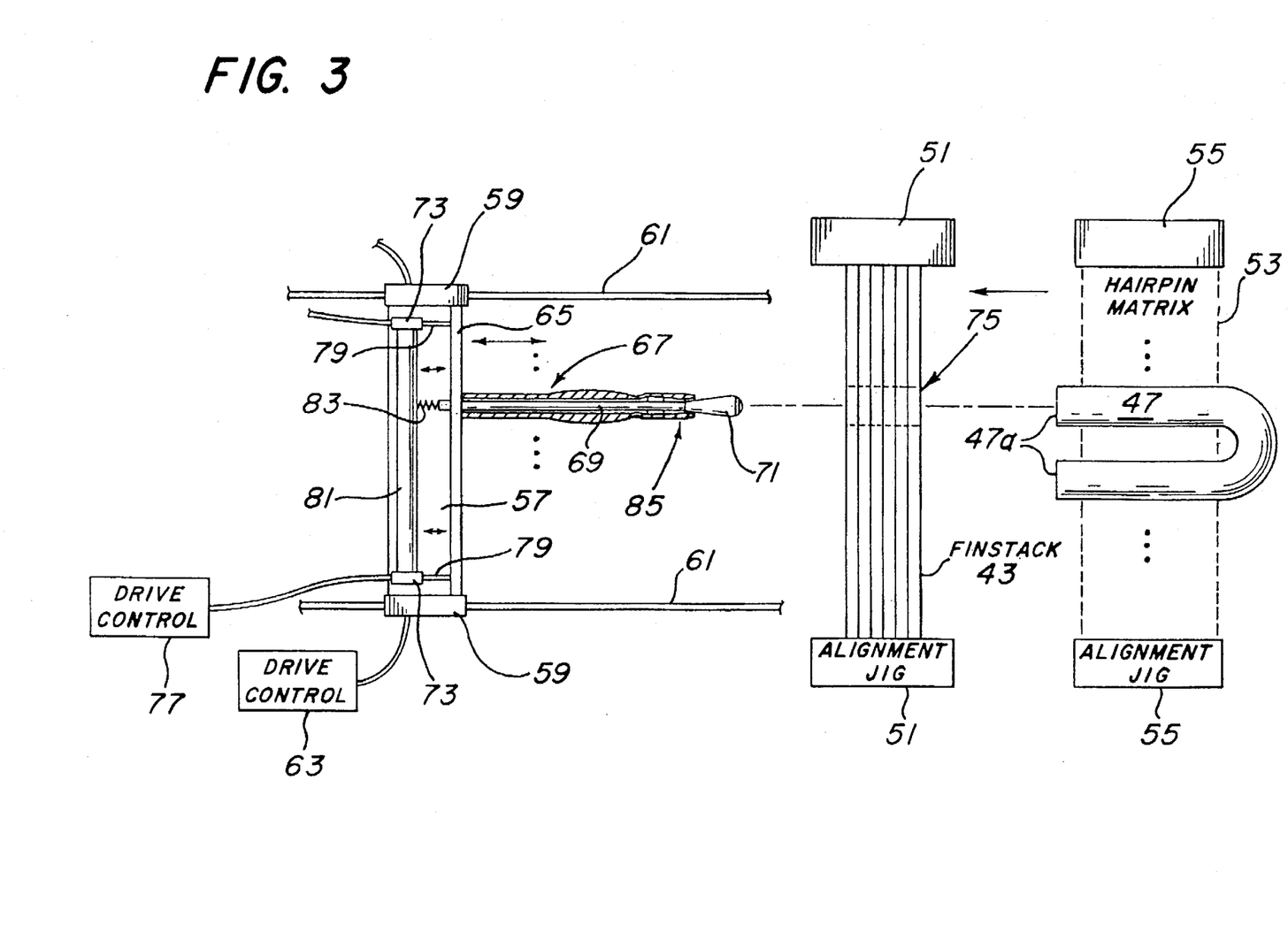
FIG. 3 is a plan view of the apparatus of the present invention for hairpinlacing showing a tube engaging guide rod in cross section.

The process steps 23, 25 and 27 of FIG. 1 are carried out by the structure shown in FIG. 3. These process steps include the process steps 35, 37, 39 and 41 of FIG. 1.

The structure shown in FIG. 3 includes the stationary fin stack 43 which has been prepunched to a desired hole pattern and clamped in a fin stack alignment jig 51 in such a way to allow for some adjustment to the positioning of the individual fins. The clamping pressure is important to the proper operation of the present invention. The clamps should be tight enough so that the adjacent individual fins are in contact with each other, yet not so tight that vertical movement of the individual fins is overly restricted by the lateral clamping. This permits the fins to be held stationary as a group, while permitting individual fins to be yieldably movable vertically into alignment with the guide rods as they are inserted. The matrix 53 of preassembled hairpin elements 47 is held in position by a second, or hairpin matrix alignment jig 55. This second jig 55 is moved forward toward the fin stack 43 so that the hairpin 47 open ends 47a are adjacent to the respective punched holes in the fin stack 43.

The guide rod apparatus includes a base 57 which is generally mounted horizontally to operate parallel to the operating floor of the assembly area. This base 57 is moved forward toward, and backward to retract from, the fin stack 43 by means of a first drive unit 59. The first drive unit 59 operates upon guides rails 61 so that its orientation is predetermined, as it approaches the fin stack 43 or is withdrawn from the fin stack 43. The guide rods are passed through the fin stack in two directions. First forward, as a coarse registration step to align the fin stack holes with the guide rods; and then backward, as a lead guide for the hairpin tubes to more finely align the individual fin holes with the advancing hairpin tube. The individual fins are therefore aligned twice by the two successive opposite motions of the guide rods.

The first drive 59 is controlled by a first drive controller unit 63. This drive controller unit can have a mechanical timing cam, be hydraulic valve operated, or electronically operated.

Rising from the base 57, at its face position adjacent to the fin stack 43, is a mounting block 65. This mounting block or mandrel 65 carries a plurality of tube engaging tubular guide rods (engagement rods) 67. These guide rods 67 are of a number and assembled in a matrix necessary to engage the respective holes 75 punched through the fin stack 43 and thereby engage the respective open ends 47a of the hairpins 47.

Positioned longitudinally within each guide rod 67 is an operating expander rod 69. Located at the leading end of each expander rod 69 is a tapered expander tip 71.

A second drive 73 is mounted to operate on the base 57 in the same longitudinal direction as the first drive 59. That is to say, the first and second drives 59, 73 act to form a two stage movement structure for movement of respectively mounted members towards and away from the fin stack 43, in alignment with the respective punched holes, which as a group form cylindrical cavity 75. The second drive 73 is connected to and controlled by a second drive controller unit 77 which operates upon its own set of guide rails 79 mounted to the base 57.

Positioned on and carried by the second drive 73 is an expander drive block 81. This expander drive block or mandrel 81 extends parallel to the mounting block 65 and operates on the side of said mounting block 65 away from the fin stack 43.

While the tubular guide rods 67 are mounted on and permanently attached to the mounting block 65, the expander rods 69, which operate within the hollow interior of the guide rods 67, are connected to expander drive block 81 by a compensator drive spring 83.

Each tube engaging guide rod 67 carries a knurled expander end which includes a plurality of radial positioned expander fingers 85. This expander end will be described in greater detail below.

The first drive controller 63 operates to cause the first drive 59 to advance and retract the base 57 from the jig 51 position of the fin stack 43. When the first drive 59 is advancing the structure toward the fin stack 43, the expander fingers 85 are relaxed and the expander rod 69 is advanced so that the tapered expander tip 71 extends beyond the expander fingers 85. In order for this to exist, the second drive controller 77 must have advanced the second drive 73 toward the mounting block 65.

Once each tubular guide rod 67 has advanced through its respective punched fin hole cavity 75 to engage the hairpin open end 47a, the advancing motion of the first drive 59 is stopped. Thereafter, the second drive withdraws from the mounting block 65 position, thereby carrying the expander rod 69 and its respective expander tip 71 down the length of the guide rod 67 to have the expander tip 71 engage the plurality of expander fingers 85.

Once the desired extension movement is completed, the second drive 73 stops its retracting movement. Thereafter, the second drive 73 is operated to withdraw the entire assembly including the base 57, mounting block 65 and its matrix of guide rods 67 away from the fin stack alignment jig 51, thereby pulling the hairpins 47 in unison out of the hairpin matrix 53 and lacing them through respective cavities 75 in the fin stack 43.

Upon completion of the lacing operation, the second drive 73 is operated to move the expander drive block 81 toward the mounting block 65, thereby extending the expander rod 69 and its respective expander tip 71 and releasing the expanded position of the fingers 85. This first drive 59 is thereafter operated to further withdraw the entire guide rod assembly from the fin stack alignment jig area so that the further steps in the heat exchanger product manufacturing process may be carried out.

Figure 4:
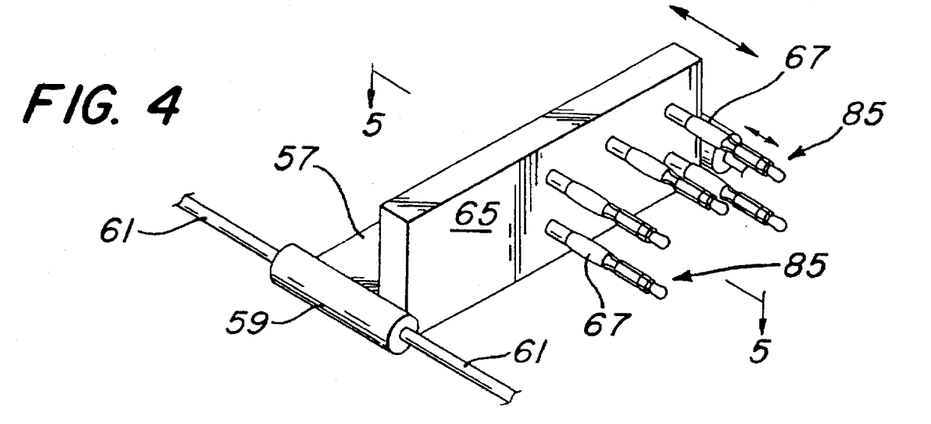
FIG. 4 is a perspective view of the mounting block, partial matrix of tube engaging guide rods, and first drive unit of the present invention.

The first drive 59, its guide rails 61 and the mounting block 65 carrying the matrix of tubular guide rods 67 are shown in perspective view in FIG. 4. The finger portion 85 of each guide rod 67 is shown. Fingers 85 are in the collapsed or unexpanded position.

Figure 5:
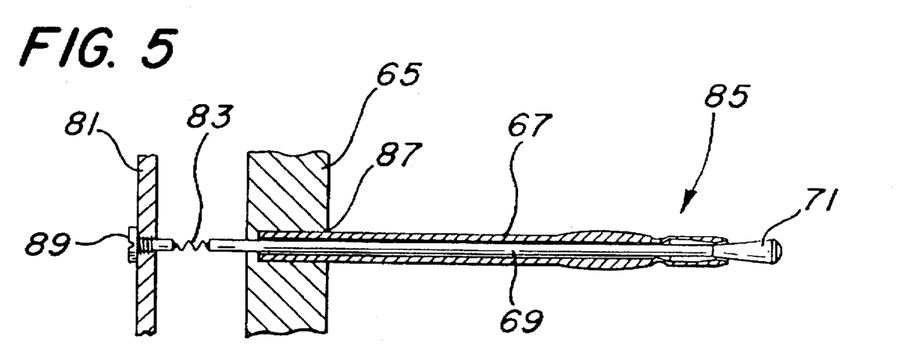
FIG. 5 is an expanded view, in partial cross section of a single tube engaging guide rod, expander rod and tip, mounting block, expander drive block, and compensating spring of the present invention, taken as shown in FIG. 4.

The mounting block 65 as shown in FIG. 5, has been pre-drilled in the hole pattern of the guide rod 67 matrix. Each guide rod 67 is positioned in its respective receiving hole 87. While these guide rods 67 may be welded or otherwise permanently fastened in their receiving holes 87, it is preferred that they be fixedly removable. This can be accomplished by a tapered fit or by tapping and threading.

The expander rod 69 operates freely within the cylindrical interior of hollow guide rod 67 under the force exerted by the expander drive block 81 through the compensator drive spring 83. The compensator drive spring 83 can be of any number of configurations including a leaf spring, a folding flat spring, a helical spring, and a coil spring. This compensator drive spring 83 can be either a linear drive spring or a variable rate drive spring.

A securement screw 89 is mounted through the expander drive block 81 for each compensator drive spring 83, and is positioned in alignment with the operating axis of the expander rod 69. The compensator drive spring 83 is attached between its respective securement screw 89 and its respective expander rod 69. This attachment can be by welding, pin attachment, clamping or other suitable means.

Figure 6:
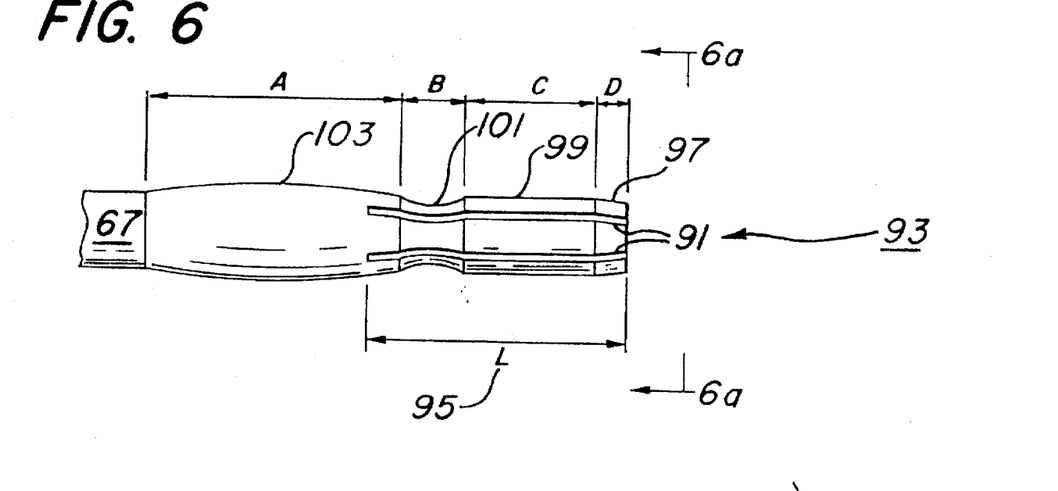
FIG. 6 is a plan view of the expanding end of a tube engaging guide rod of the present invention.
Figure 6A:
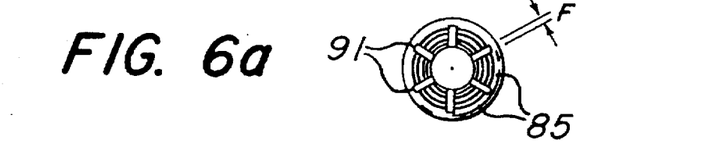
FIG. 6a is an end view of the rod taken as shown in FIG. 6.

Referring now to FIG. 6, the hairpin opening engagement end of a guide rod 67 is shown in a plan view. A plurality of longitudinal slots 91 extend from the engaging end 93 of a guide rod 67. The slot length 95 will vary as a function of the materials used for the fin stack and the materials used for the hairpins. The pulling pressure, i.e., the lacing pressure, will also determine slot length 95. The number of slots 91 cut radially in the engagement pin is shown in FIG. 6a. Here, six slots 91 create six expanding fingers 85. Of course, as the inner transverse profile of each hairpin tube is circular, the transverse profile of the guide rod is likewise circular.

In referring back to FIG. 6, the engagement end of a guide rod 67 has an aligning tapered portion 97 at its lead end. Extending backwardly therefrom is a tube engagement portion 99 which in the resting or unexpanded position extends generally parallel to the longitudinal axis of the guide rod 67.

Adjacent to this tube engagement portion 99 is a spring portion 101 which is created by an annular indentation, normal to the longitudinal axis of the guide rod 67. This spring portion 101, with its annular indentation, creates a narrower wall thickness for the guide rod 67.

Positioned adjacent to the spring portion 101 and further removed from the engagement end 93 is lead guide 103 which is created by a guide rod 67 wall protrusion of lateral parabolic profile providing bi-directional, forward and backward, tapered surfaces. The arc of this lead guide 103 is dictated by the tolerances in size between a punched stack hole, hairpin tubing size, and the outside diameter of the guide rod 67. The shape and dimension of the lead guide 103 is critical to the operation of the invention. It is important that the largest diameter of the lead guide be the largest diameter of the guide rod and be equal to, or greater than, the outside diameter of the hairpin tubing. The lead guide must remain at all times beyond the end of the tubes without entering them.

Figure 7:
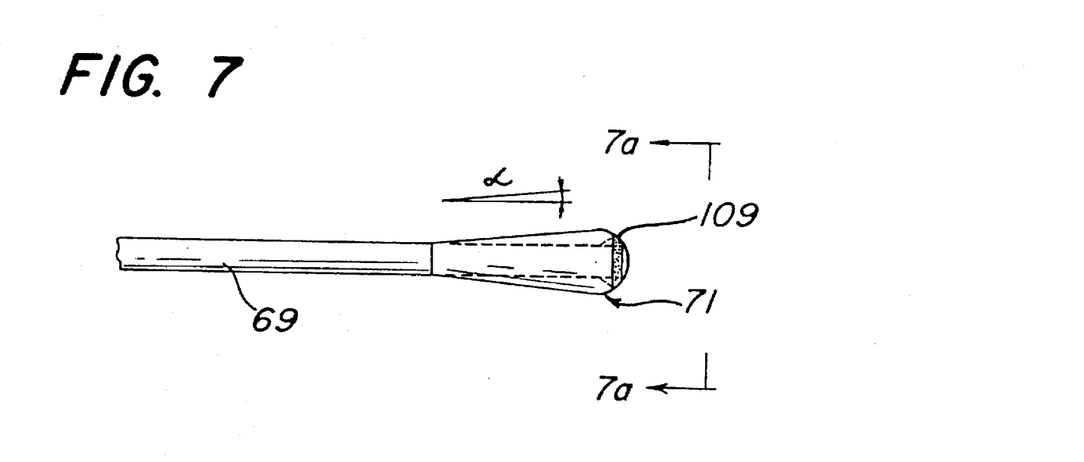
FIG. 7 is a side view of an expander rod and tip of the present invention.

The expander rod 69 is shown in side elevation in FIG. 7 with the expander tip 71 mounted thereon. The expander tip 71 leading edge 109 is round and its base is a generally frusto-conical shape 107 leading backwardly from the round leading edge. The expander tip 71 has been drilled to receive the expander rod 69 and can be mounted on this rod 69 by pinning it thereto.

Figure 7A:
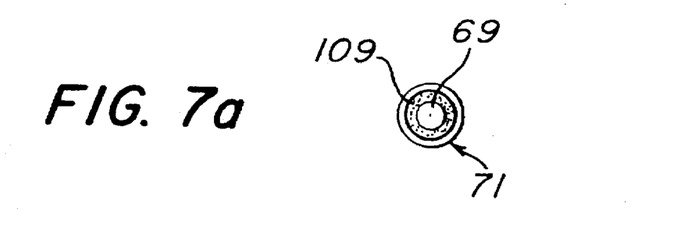
FIG. 7a is a longitudinal view of the expander rod and tip taken as shown in FIG. 7.

A longitudinal view of the expander rod 69 and the tip 71, FIG. 7a, shows them to be in concentric longitudinal alignment. The tapered angle $\alpha$ of the frusto-conical surface 107 of the expander tip 71 can be of a range from 5-degrees to 45-degrees, and in the present embodiment is approximately 12-degrees.

Other structures can be used for this conical surface 107. However, the conical surface 107 eliminates any alignment problems when the expander tip 71 is operating upon the expander fingers 85 shown in FIG. 6.

Figure 8:
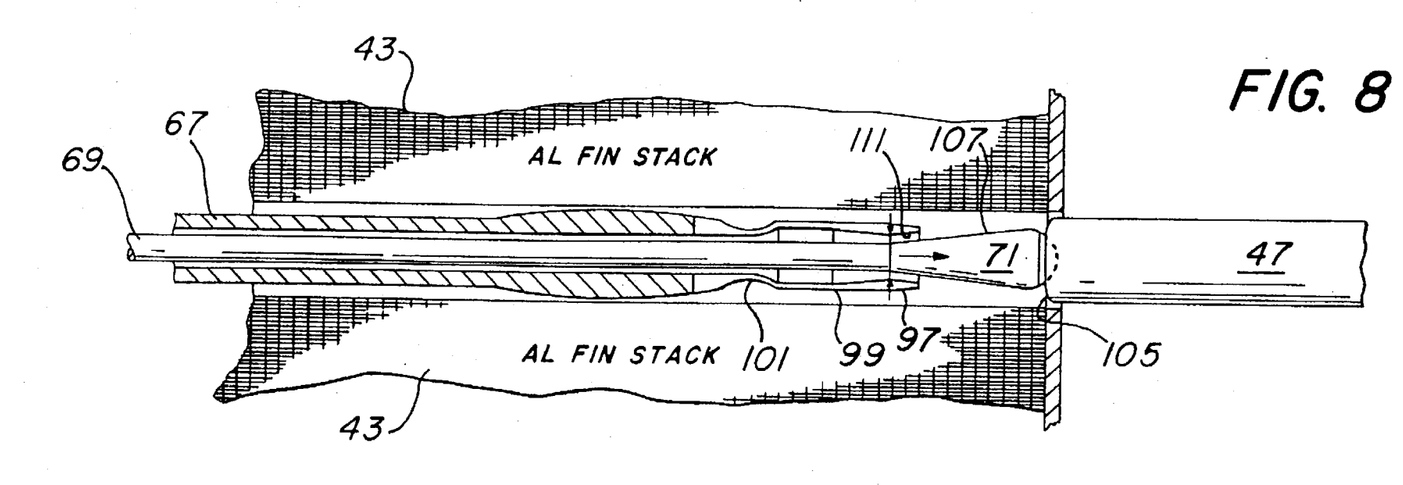
FIG. 8 is a partial sectional view era single tube, engaging guide rod extending through fin stack hole to a hair pin tube.

After the aluminum fin stack 43 has been penetrated by the guide rod as shown in FIG. 8, it is moved beyond the fin stack to a position within the hairpin tube 47 to engage it. The open end of a hairpin tube 47 generally will carry a crimp or burr 105 from the parting off operation. A leading edge 97 of tube engagement taper length 99 will allow the fingers to flex inwardly slightly to penetrate the open end of the hairpin tube and pass the crimp 105.

Figure 9:
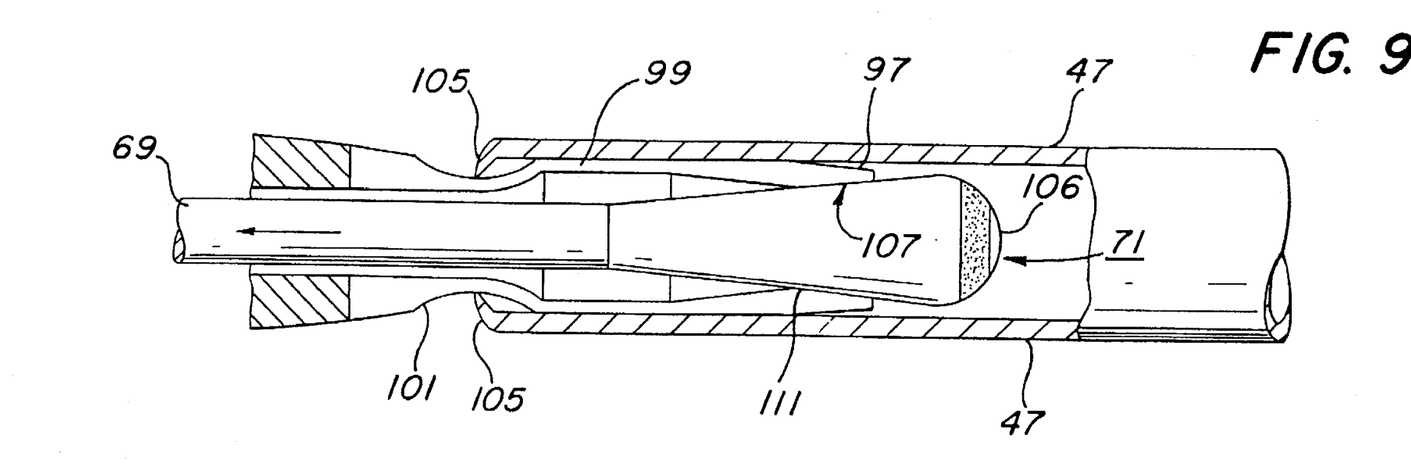
FIG. 9 is a partial sectional view of a single tube, engaging guide rod expander fingers in engagement to pull (lace) a hairpin tube.

As shown in FIG. 9, after entry into tube 47, when a sufficient length of the engagement portion 99 has passed the crimp 105, the insertion of the guide rod assembly is stopped. The expander rod 69 and its expander tip 71 are then retracted to expand fingers 85 against the inner wall of tube 47.

Referring further to FIG. 9, the inside surface of the leading end of fingers 85 includes an inwardly tapered buildup 110. This buildup 110 forms an inwardly tapering camming surface 111 of conical shape. The tapering angle of this camming surface 111 is similar and preferably identical to the angle of the tapered camming surface 107 of the expander tip 71. The operation of camming surface 107 against camming surface 111 forces the expander fingers to move radially outwardly so that the respective tube engagement portions 99 of the fingers engage the inside walls of the hairpin tube 47. Once this has been done with sufficient engagement force to pull the tube 47 in unison with the guide rod, but not so considerable as to distort its shape or size, the entire guide rod assembly is retracted, as stated above, to lace the hairpin tube 47 through the fin stack.

During the penetration of the tube 47, the rounded leading surface 106 of the expander tip assists with alignment. This leading surface 106 acts as a first aligning surface against the tube crimp 105 which further assists in aligning the taper portion 97 of the fingers 85 with the hairpin tube open ends.

The present invention operates on clearances of from 0.002" to 0.004". The clearance for the hairpin tube with respect to the punched hole is approximately 0.001" to 0.003". The expansion of the fingers 85 caused by the operation of the expander tip 71 is approximately 0.002".

Figure 10:
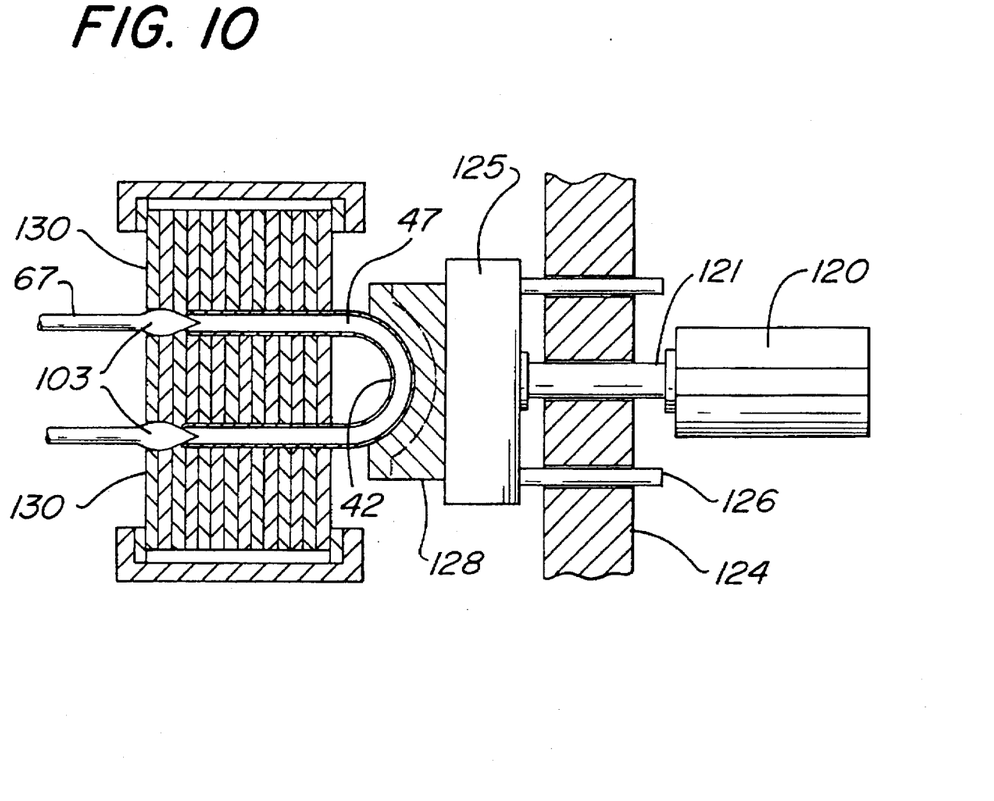
FIG. 10 is a plan sectional view of the hairpin tube engaging the end of the guide rods by force applied to the elbow end of the hairpin tube.

Referring now to FIG. 10, an alternate embodiment includes the substitution of the expanding tip and engagement rod structures of the guide rod with a hairpin force-applying means 120 to achieve engagement between the hairpin tube 47 end and the guide rod 67. The force-applying means 120 operates piston rod 121 through guide block 124 to move pusher block 125 which is supported by guide pins 126. A shoe 128, mounted on the pusher block, includes a curved surface which conforms to the shape of the hairpin tube elbow 42 to apply the force evenly to the hairpin tube and without deflecting it. As the pusher block is moved against the hairpin tube, the tube is forced through the individual fins 130. The force against the tubes holds them engaged with lead guides 103 at the ends of guide rods 67 and pushes them backward through the fin stack. The backside tapered surfaces of the lead guides establish the location of the hairpin tube ends as they move through the individual holes of each fin, and align the fin holes which are out of registration with the axis of the guide rods. Alternatively, the guide rods may be retracted by the force means 120 acting through the tubes, or means 120 may be activated in coordination with the first drive unit 59 shown in FIG. 3 which retract the guide rods.

Figure 10A:
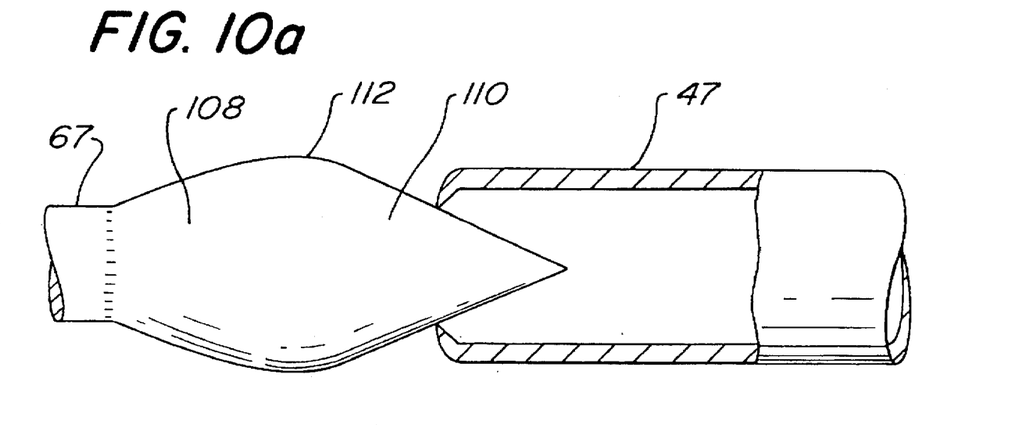
FIG. 10a is an enlarged plan sectional view of the engaged guide rod and hairpin tube.

Referring now to FIG. 10a, the relationship between the lead guides and tubing open end is more clearly shown. Each lead guide being of enlarged diameter relative to the remainder of the guide rod is located at the end of each guide rod 67 and includes a forward-leading tapered surface 110 which penetrates the open end of tubing 47 to hold it in alignment therewith. This surface 110 also acts as a guide for the guide rod as it is initially inserted through the fin stack in the forward direction to the opposite side of the fin stack where the hairpin tubes are placed. As in the previous embodiment, a critical feature is the shape of the lead guide which provides opposing tapered surfaces 108 and 110 leading from a central portion 112 of the lead guide of maximum diameter. A backside tapered surface 108 convergent in a backward direction lies on the opposite side of the central portion of the lead guide 112 and provides a lead guide for a hairpin tube as it moved in the backward direction through the fin stack.

The lead guide in this embodiment may have the same longitudinal parabolic shape as described in the previous embodiment, serving exactly the same function. In either embodiment, the fins within the stack are aligned twice, once during each pass of the lead guide. This reduces the chances of severe misalignment of the fin stack holes during the second pass in the backward direction as the hairpin tubes are inserted through the fin stack. Also, because the reverse angle, tapered surface operates as a traveling lead guide that presents a maximum diameter only along a small portion of the guide rod, friction between the guide rod and the fins is minimized because only a small number of fins are in contact with the lead guide at any one time.

Another important advantage over the prior art is that in the present invention, the fin stack is held stationary while the guide rods and hairpin tubes are moved. Because the fins are clamped together, the stack as a group provides lateral support to each fin and, hence, the individual fins are maintained in a fiat and straight condition. In some prior art devices, the guide rods and hairpin tubes are stationary, while the fin stack is "raked" along the guide rods and pulled over the hairpin tubes. Moving the fin stack according to this prior art method creates a loss of control over the condition of the individual fins and can also distort the individual fin holes because they are dragged along the full length of the surfaces of the guide rods and hairpin tubes. Other advantages of the present invention will be apparent to those of ordinary skill in the art.

The above description is intended to be illustrative of the invention. Many changes can be made in the above-described embodiments without departing from the intent or scope of the invention. Some of these changes can present several modifications to the present structure, while producing the same operation or result as the present embodiment. These changes are intended to be incorporated as part of the present invention. The scope of the present invention, therefore, is to be defined by the claims appended hereinafter.

What is claimed is:

1. A hairpin tube lacing apparatus, comprising:

a plurality of heat exchanger fins clamped laterally to create a fin stack, each of said fins being yieldably movable vertically and having a plurality of registered lateral holes forming a plurality of cylindrical cavities in said stack for receiving hairpin tubes;

a plurality of guide rods, each having a double tapered lead guide at a first end, and being held by a mounting block at a second end, each guide rod being axially aligned and centered about a corresponding fin hole cavity;

means for moving said mounting block laterally, forward and backward between extended and retracted positions respectively, said extended position placing each of said first ends of the guide rods completely through a corresponding fin hole cavity to a point on an opposite side of said fin stack;

a first tapered surface on the forward side of said lead guide convergent in the forward direction providing a forward lead guide surface of said guide rod for said fins;

a second tapered surface on the backward side of said lead guide convergent in the backward direction providing a backward lead guide surface for said hairpin tube;

a plurality of hairpin tubes having open-ended parallel legs at one end and an elbow at the other end, each leg held on the opposite side of the fin stack in axial alignment with one of said guide rods;

means for forcibly engaging the tapered first ends of said guide rods with open ends of said hairpin tubes while said guide rods are in the extended position; and means for moving said rods and tubes in unison in the backward direction through said fin stack to the retracted position.

2. The apparatus of claim 1, further described in that said lead guide includes a center portion of maximum diameter also being the maximum diameter of said guide rod.

3. The apparatus of claim 2, wherein said means for moving said rods and tubes in the backward direction comprises force-applying means acting upon each hairpin elbow.

4. The apparatus of claim 3, further including retracting means acting independently upon said rods for moving said rods in the backward direction in unison with the movement of said tubes.

* * * * *